United States Patent [19]

Ohst et al.

[11] Patent Number: 4,840,989

[45] Date of Patent: Jun. 20, 1989

[54] COPOLYMER MADE FROM N-VINYLAMIDES AND PERFLUOROALKYL GROUP-CONTAINING, ETHYLENICALLY UNSATURATED COMPOUNDS, A PROCESS FOR THEIR PREPARATION, AND THEIR USE

[75] Inventors: Holger Ohst, Aachen; Wolfgang Podszun, Cologne; Carlhans Süling, Odenthal; John Goossens; Günther Penners, both of Leverkusen, all of Fed. Rep. of Germany

[73] Assignee: Bayer Aktiengesellschaft, Leverkusen, Fed. Rep. of Germany

[21] Appl. No.: 249,132

[22] Filed: Sep. 26, 1988

Related U.S. Application Data

[63] Continuation of Ser. No. 141,880, Jan. 6, 1988, abandoned.

[30] Foreign Application Priority Data

Jan. 20, 1987 [DE] Fed. Rep. of Germany ....... 3701408

[51] Int. Cl.$^4$ ........................ C08L 27/12; C08F 12/30
[52] U.S. Cl. .................................. 524/544; 524/545; 526/243
[58] Field of Search ................. 526/243; 524/548, 555, 524/544, 545

[56] References Cited

U.S. PATENT DOCUMENTS

| | | | |
|---|---|---|---|
| 3,073,794 | 1/1963 | Stoner | 524/548 |
| 3,821,175 | 6/1974 | Daniels et al. | 524/555 |
| 4,058,124 | 11/1977 | Yen et al. | 524/555 |
| 4,333,795 | 6/1982 | Street | 524/548 |
| 4,557,837 | 12/1985 | Clark, III et al. | 166/307 |

FOREIGN PATENT DOCUMENTS

| | | | |
|---|---|---|---|
| 0034527 | 8/1981 | France | 526/243 |
| 60-81253 | 5/1985 | Japan | 524/555 |
| 60-92360 | 5/1985 | Japan | 524/555 |
| 61-247763 | 11/1986 | Japan | 524/555 |
| 8201007 | 4/1982 | PCT Int'l Appl. | 526/243 |

*Primary Examiner*—Joseph L. Schofer
*Assistant Examiner*—N. Sarofim
*Attorney, Agent, or Firm*—Sprung Horn Kramer & Woods

[57] ABSTRACT

The invention relates to copolymers containing 0.01 to 35 mole-% relative to the total monomer composition, of one or more polymerized perfluoroalkyl group-containing monomer units, 55 to 99.99 mole-% of one or more polymerized N-vinylamide monomer units, and 0 to 10 mole-% of one or more further comonomers, a process for the preparation of the copolymers, and their use as emulsifiers and dispersants in aqueous systems.

10 Claims, No Drawings

COPOLYMER MADE FROM N-VINYLAMIDES AND PERFLUOROALKYL GROUP-CONTAINING, ETHYLENICALLY UNSATURATED COMPOUNDS, A PROCESS FOR THEIR PREPARATION, AND THEIR USE

This is a continuation of application Ser. No. 141,880, filed 1-6-88 now abandoned.

The invention relates to copolymers containing 0.01 to 35 mole-% relative to the total monomer composition, of one or more polymerized perfluoroalkyl group-containing monomer units, 55 to 99.99 mol-% of one or more polymerized N-vinylamide monomer units, and 0 to 10 mole-% of one or more further comonomers, a process for the preparation of the copolymers, and their use as emulsifiers and dispersants in aqueous systems.

It has been disclosed that N-vinylpyrrolidone can be polymerized by conventional processes, for example in solution or in bulk, at 20° to 80° C. using initiators acting as free radicals. Copolymers of N-vinylpyrrolidone with longer-chain olefins or with acrylates or methacrylates have likewise been disclosed (for example German Offenlegungsschrift No. 2,330,601). They are used as surface-active polymers. Copolymers of N-vinylpyrrolidone with vinyl alkyl ethers have also been disclosed (F.P. Sidel'kovskaya, M.F. Zelinski, F. Ibraginov and M.A. Askarov; Vysokomolek. Soedin 6, 1585-90 (1964)).

U.S. Pat. No. 3,474,079 describes copolymers of N-vinyllactams and partly fluorinated, unsaturated acid esters which can be used to reduce the solidification point of mineral oil, as viscosity improvers, or surface coating and for paper and leather treatment.

European Patenten Application No. 0,034,527 describes terpolymers having high contents (35 to 98%) of perfluoroalkyl group-containing esters of $\alpha,\beta$-unsaturated carboxylic acids, N-vinylpyrrolidones and a third comonomer as oilproofing and waterproofing agents, in particular for pater treatment.

German Offenlegungsschrift No. 3,415,975 describes fluorine-containing copolymers made from vinyl esters and fluorine-containing monomers. After saponification, these give water-soluble copolymers which are effective as surface-active substances. However, these products not only have the disadvantage of a two-stage synthesis, but they are also unstable to hydrolysis in aqueous solution over a broad pH range, depending on the degree of saponification.

It has now been found that perfluoroalkyl group-containing, water-soluble copolymers having improved hydrolysis stability are obtained in one reaction step when N-vinylamides are copolymerized with perfluoroalkyl group-containing, ethylenically unsaturated monomers, if appropriate in the presence of further comonomers.

The invention therefore relates to copolymers containing 0.01 to 35 mole-% relative to the total monomer composition, of one or more polymerized perfluoroalkyl group-containing monomer units, 55 to 99.99 mole-% of one or more polymerized N-vinylamide monomer units, and 0 to 10 mole-% of one or more further polymerized comonomers.

The copolymers according to the invention preferably contain 0.01 to 20 mole-% of perfluoroalkyl group-containing polymerized monomer units.

The invention furthermore relates to a process for the preparation of these copolymers, which is characterized in that 0.01 to 35 mole-% relative to the total amount of monomer employed, of perfluoroalkyl group-containing, ethylenically unsaturated monomers, 55 to 99.99 mole-% of N-vinylamides and 0 to 10 mole-% of further comonomers are copolymerized by means of free radicals.

The copolymerization according to the invention is preferably carried out in solution.

The invention furthermore relates to the use of these perfluoroalkyl group-containing copolymers according to the invention as emulsifiers, protective colloids and dispersants, and for surface modification of organic and/or inorganic substrates.

The copolymers according to the invention contain linear or branched, cyclic or acyclic perfluoroalkyl group-containing, ethylenically unsaturated monomer units of the formula (I).

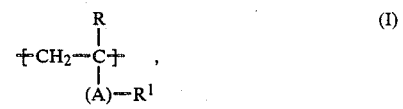

in which

R represents hydrogen (H), or $C_1$–$C_4$-alkyl, preferably H or methyl,

A represents -O-

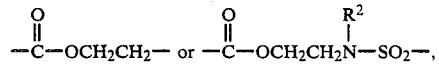

where $R^2$ represents hydrogen (H) or $C_1$–$C_{10}$-alkyl, preferably H, $CH_3$, $C_2H_5$, $C_3H_7$, $C_4H_9$, $C_5H_{11}$ or $C_6H_{13}$, and $R^1$ represents $C_nF_{2n+1}$, where n denotes an integer from 4 to 20, preferably 4 to 12.

Examples of monomers which provide structural units of the formula I and which may be mentioned are: perfluorobutyl vinyl ether, perfluorooctyl vinyl ether, perfluorobutylethyl acrylate, perfluorooctylethyl methacrylate, N-methyl-N-perfluorobutylsulphonamidoethyl acrylate, N-methyl-N-perfluorooctylsulphonamidoethyl methacrylate, N-ethyl-N-perfluorooctylsulphonamidoethyl methacrylate or N-propyl-N-perfluorooctylsulphonamidoethyl acrylate. Mixtures of perfluoroalkyl monomers can also be employed.

The synthesis of perfluoroalkyl group-containing monomers on an acrylate or methacrylate basis has been disclosed (for example FR No. 2,034,142).

Particularly preferred monomers containing perfluoroalkyl groups and corresponding to the formula (I) are N-methyl-N-perfluorooctylsulphonylaminoethyl methacrylate, perfluorooctyl vinyl ether and N-methyl-N-perfluorooctylsulphonamidoethyl acrylate.

In general, vinylamides are suitable for the copolymerization, and open-chain and cyclic N-alkylated N-vinylamides are particularly suitable for the copolymers according to the invention. Cyclic N-vinylamides containing monomer units of the formula II

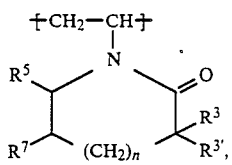

in which n represents the number 0, 1 or 2, and $R^3$, $R^{3'}$, $R^4$ and $R^5$, independently of one another, represent hydrogen (H) or $C_1$–$C_4$-alkyl groups, may preferably be used.

Suitable open-chain vinylamides are preferably vinylamides which contain monomer units of the formula III

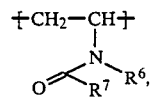

in which $R^6$ and $R^7$, independently of one another, represent $C_1$–$C_4$-alkyl groups or in which $R_6$ represents H and $R_7$ represents $C_1$–$C_4$-alkyl groups.

Examples of cyclic N-vinylamides which may be mentioned are N-vinylpyrrolidone, N-vinylpiperidone and N-vinylcaprolactam.

Examples of open-chain N-vinylamides which may be mentioned are the N-methyl-N-vinylamides of acetic acid, propionic acid or butyric acid, or vinylformamide or vinylacetamide. N-methyl-N-vinylacetamide, N-vinylpyrrolidone and N-vinylcaprolactam and mixtures of N-vinylamides are particularly preferred.

Suitable further comonomers are, for example, ethylenically unsaturated monomers which can copolymerize with the perfluoroalkyl group-containing comonomer units and N-vinylamides, for example butadiene, isoprene, chloroprene, styrene, α-methylstyrene, p-methylstyrene, vinyl halides, such as vinyl chloride, vinylidene chloride, vinylidene fluoride, vinyl esters, such as vinyl acetate, vinyl propionate or vinyl stearate, vinyl methyl ketone, acrylic acid, methacrylic acid, maleic anhydride, acrylates or methacrylates, such as methyl acrylate, methyl methacrylate, ethyl acrylate, ethyl methacrylate, propyl acrylate, lauryl acrylate or methacrylate, decyl acrylate, N,N-dimethylaminoethyl methacrylate, 2-hydroxyethyl methacrylate, 2-hydroxypropyl methacrylate and glycidyl methacrylate, amides and nitriles, such as acrylamide, methacrylamide, N-methylolacrylamide, acrylonitrile and methacrylonitrile, or N-substituted maleic imides or ethers. such as vinyl butyl ether, vinyl isobutyl ether or vinyl phenyl ether. Mixtures of these comonomers are also suitable.

These comonomers can be used in amounts from 0 to 10 mole-% relative to the total amount of monomer in the copolymerization, preferably in amounts from 0,01 to 10 mole-%.

The copolymers according to the invention are obtained, for example, by copolymerization of perfluoroalkyl group-containing monomers and N-vinylamides, and also, if appropriate, further comonomers, in bulk or in emulsion or suspension, preferably in solution, using conventional initiators which are suitable for free-radical polymerization. The polymerization can be carried out using the batch or metered-addition method. The proportion of perfluoralkyl group-containing, ethylenically unsaturated monomer units is 0.01 to 35 mole-%, the proportion of N-vinylamides is 55 to 99.99 mole-%, and the porportion of further comonomers is 0 to 10 mole-%, preferably from 0,01 to 10 mole-%.

In a preferred procedure, 0.01 to 20 mole-%, relative to the total amount of monomer, of perfluoroalkyl group-containing, ethylenically unsaturated monomers, 70 to 99.99 mole-% of N-vinylamides and 0 to 10 mole-%, preferably 0,01 to 10 mole-% of further comonomers are dissolved in an organic solvent together with the free-radical initiator and polymerized in a conventional fashion at 60°–80° C. for 2 to 20 hours.

Polymerization initiators which can be used are, for example, conventional organic peroxides, such as benzoyl peroxide, t-butyl hydroperoxide, cumene hydroperoxide and dibenzoyl peroxide, azo compounds, such as azo-di-isobutyronitrile, and also peresters, such as t-butyl per-2-ethylhexanoate, in an amount from 0.5 to 5 mole-%, relative to the total amount of monomer, preferably 1 to 3 mole-%, particularly preferably 2 to 2.5 mole-%. The use of persulphates as polymerization initiators is also possible. In order to initiate the polymerization at low temperatures, redox systems based on per compounds and amines or based on persulphates and compounds of tetravalent sulphur can be used.

Organic solvents which can be used are primary, secondary or tertiary aliphatic alcohols, such as, for example, methanol, ethanol, isopropanol or tert, butanol, preferably methanol and tert.-butanol, particularly preferably tert. butanol, in an amount such that the total monomer concentration is in the range from 0.1 to 2.0 mole/l, preferably 0.6 to 1.2 mole/l. Of course, it is possible to carry out the polymerization in an aqueous medium or in water/solvent mixtures.

After removal of the solvent by a known drying process, the copolymers prepared according to the invention can be obtained in solid form, preferably as a powder. It may alternatively be advantageous to remove only part of the solvent when the polymerization is complete and to precipitate the polymer by adding a nonpolar solvent, for example hexane.

The perfluoroalkyl group-containing copolymers according to the invention may be water-soluble, water-swellable or water-insoluble, depending on the content of the individual comonomer units in the copolymer.

The perfluoroalkyl group-containing copolymers according to the invention can be used as emulsifiers, protective colloids and dispersants. The copolymers according to the invention can also be used for surface modification of organic and/or inorganic substrates.

With respect to the range of properties of the perfluoroalkyl group-containing copolymers according to the invention, it has surprisingly been found that those containing comonomer units which contain perfluorinated, saturated aliphatic, linear or branched radicals having 1 to 20, preferably 1 to 12, in particular 6 to 8, C atoms have excellent dispersing and emulsifying properties.

Discersion experiments using aqueous, hydrophilic silicon oxide ($SiO_2$) dispersions and $SiO_2$ dispersions in which the particles have been hydrophobized using an organic silane show that copolymers according to the invention stabilize hydrophilic and hydrophobic surfaces equally well.

For this purpose, $SiO_2$ dispersions containing both hydrophilic and hydrophobic particles and stabilized with the copolymers according to the invention were prepared and the decrease in dispersion turbidity as a consequence of aggregation and sedimentation was observed as a measure of the stability. Dispersions without polymer were used as the comparison (blank value). The dispersions contained 0.2% by weight of $SiO_2$, 0.05% by weight of polymer and 0.5M NaCl (electrostatic repulsion between the $SiO_2$ particles).

In addition, comparison dispersions were prepared, a N-vinylpyrrolidone homopolymer having a comparable molecular weight being employed as the protective colloid. Compared to this, the copolymers according to the invention exhibited a clearly better stabilizing action.

The emulsifying properties of the copolymers according to the invention were examined in oil-in-water emulsions of various insoluble or partly soluble organic liquids from the group comprising the aromatic hydrocarbons (for example toluene), the aliphatic hydrocarbons (for example isododecane), the amines (for example diethylaniline) and the esters (for example n-butyl acetate), and the appearance or migration of the phase boundary was observed in a sealed glass cylinder as a function of time. The emulsions contained 60% by volume of water and 2% by weight of the copolymers according to the invention, relative to the aqueous phase.

The comparison samples used were emulsions prepared using an N-vinylpyrrolidone homopolymer having a comparable molecular weight as emulsifier or protective colloid. At comparable molecular weights and solution viscosities, the use of the perfluoroalkyl group-containing copolymers according to the invention had led to clearly more stable emulsions, even at low proportions of the comonomer units mentioned.

EXAMPLES

EXAMPLE 1

Preparation of an N-vinylpyrrolidone copolymer.

26.6 g (0.24 mole) of N-vinylpyrrolidone, 4.9 g (0.008 mole) of N-methyl-N-perfluorooctylsulphonamidoethyl methacrylate, 230.0 g of tert. butanol and 1.0 g of azodi-isobutyronitrile are placed in a flask equipped with stirrer, thermometer and reflux condenser under nitrogen as inert gas. The reaction mixture is heated to 70° C. After a polymerization time of 16 hours, the reaction solution is freed from monomeric N-vinylpyrrolidone by distillation under reduced pressure. The residue is washed with hexane and subsequently dried at 50° C. 25.0 g of copolymer are isolated.

A copolymer having a reduced specific viscosity of 18 ml/g, measured on a 1% strength solution of the copolymer at 30° C. in methanol, is obtained.

Composition of the copolymer according to elemental analysis: C: 57.1%, H: 8.0%, N: 9.7% and F: 6.7%.

EXAMPLE 2

Preparation of an N-methyl-N-vinylacetamide copolymer.

24.8 g (0.25 mole) of N-methyl-N-vinylacetamide and 2.5 g (0.004 mole) of N-methyl-N-perfluorooctylsulphonamidoethyl methacrylate, 230.0 g of tert. butanol and 1.0 g of azo-di-isobutyronitrile are placed in a flask equipped with stirrer, thermometer and reflux condenser under nitrogen as inert gas. The reaction mixture is heated to 72° C. During the polymerization, the reaction mixture becomes turbid due to precipitating polymer. After a polymerization time of 16 hours, the reaction solution is freed from monomeric N-methyl-N-vinylacetamide by distillation under reduced pressure. The residue is washed with hexane. After drying at 50° C., 21.8 g of copolymer having a reduced specific viscosity of 12 ml/g, measured on a 1% strength solution of the copolymer at 30° C. in methanol, remain.

Composition of the copolymer according to elemental analysis: C: 57.0%, H: 9.4%, N: 10.7% and F: 4.6%.

EXAMPLE 3

The following solutions are prepared in separate flasks equipped with stirrer, thermometer and reflux condenser:

| | | |
|---|---|---|
| (a) | 27.8 g (0.250 mole) | of N—vinylpyrrolidone |
| | 1.2 g | of N—methyl-N—perfluorooctyl-sulphonamidoethyl acrylate |
| | 230.0 g | of tert. butanol |
| | 1.0 g | of azo-di-isobutyronitrile |
| (b) | 27.2 g (0.245 mole) | of N—vinylpyrrolidone |
| | 2.5 g (0.004 mole) | of N—methyl-N—perfluorooctyl-sulphonamidoethyl acrylate |
| | 230.0 g | of tert. butanol |
| | 1.0 g | of azo-di-isobutyronitrile |
| (c) | 26.6 g (0.240 mole) | of N—vinylpyrrolidone |
| | 4.9 g (0.008 mole) | of N—methyl-N—perfluorooctyl-sulphonamidoethyl acrylate |
| | 230.0 g | of tert. butanol |
| | 1.0 g | of azo-di-isobutyronitrile |

All three solutions are heated to 72° C. and polymerized for 16 hours under nitrogen as inert gas. The solutions are subsequently distilled under reduced pressure in order to remove monomeric N-vinylpyrrolidone. The concentrated residue is washed repeatedly with hexane and subsequently dried at 50° C.

In detail, (a) 25.9 g, (b) 25.8 g and (c) 26.7 g of copolymer are obtained.

Characterization of the copolymers gives the following individual values:

| | (a) | (b) | (c) |
|---|---|---|---|
| specific reduced viscosity, measured on a 1% strength solution in methanol at 30° C. | 21 ml/g | 26 ml/g | 25 ml/g |
| Composition according to elemental analysis: | | | |
| C | 59.8% | 59.3% | 57.8% |
| H | 8.69% | 8.39% | 7.7% |
| N | 10.7% | 10.3% | 9.4% |
| F | 1.89% | 3.5% | 6.3% |

EXAMPLE 4

Preparation of a terpolymer.

13.9 g (0.125 mole) of N-vinylpyrrolidone, 17.4 g (0.125 mole) of N-vinylcaprolactam, 6.3 g (0.01 mole) of N-methyl-N-perfluorooctylsulphonamidoethyl methacrylate, 230.0 g of tert. butanol and 1.0 g of azo-diisobutyronitrile are placed in a flask equipped with stirrer, thermometer and reflux condenser under nitrogen as inert gas.

The further procedure is subsequently carried out as described in Example 1. 23.2 g of copolymer having a reduced specific viscosity of 20 ml/g, measured on a 1% strength solution of copolymer at 30° C. in methanol, are obtained.

Composition of the copolymer according to elemental analysis: C: 58.8%, H: 8.2%, N: 9.6% and F: 6.3%.

EXAMPLE 5

Preparation of a terpolymer.

25.5 g (0.23 mole) of N-vinylpyrrolidone, 1.0 g (0.01 mole) of methyl methacrylate, 6.1 g (0.01 mole) of N-methyl-N-perfluorooctylsulphonamidoethyl acrylate, 230.0 g of tert. butanol and 1.0 g of azo-di-isobutyronitrile are placed in a flask equipped with stirrer, thermometer and reflux condenser under nitrogen as inert gas. The further procedure is subsequently carried out as described in Example 1.

24.3 g of copolymer having a reduced specific viscosity of 19 ml/g, measured on a 1% strength solution of the copolymer at 30° C. in methanol, are obtained.

Composition of the copolymer according to elemental analysis: C: 63.8%, H: 7.9%, N: 11.8% and F: 1.3%.

Comparison Example 1

Preparation of an N-vinylpyrrolidone homopolymer.

27.89 g (0.25 mole) of N-vinylpyrrolidone, 230.0 g of tert. butanol and 1.0 g of azo-di-isobutyronitrile are placed in a polymerization apparatus corresponding to Example 1. The reaction mixture is heated to 72° C. After a polymerization time of 16 hours, the polymerization reaction is terminated by adding hydroquinone, and about 200 g of distillate are removed from the mixture in a rotary evaporator at 50° C. and 200 mbar.

The poly-(N-vinylpyrrolidone) is precipitated from the viscous residue by adding 300 g of hexane, is isolated, and is dried at 50° C.

23.0 g of poly-(N-vinylpyrrolidone) having a reduced specific viscosity of 25 ml/g measured on a 1% strength solution of the copolymer at 30° C. in methanol, are obtained.

EXAMPLE 6

Determination of the emulsifying properties of a perfluoroalkyl group-containing N-vinylpyrrolidone copolymer.

8 ml of isododecane and 12 ml of a 2% strength by weight aqueous solution (pH=7) of a copolymer made from copolymerized N-vinylpyrrolidone and N-methyl-N-perfluorooctyl-sulphonamidoethyl methacrylate (having a reduced specific viscosity of 19 ml/g in methanol at 30° C. and a proportion of perfluoroalkyl group-containing monomer units of 5 mole-% are placed in a 50 ml beaker. The organic and aqueous phase were homogenized for 2 minutes at 22° C. using a rotastator at 10,000 rpm, 9 g of the resultant oil-in-water emulsion were transferred into a test tube, and the migration of the phase boundary measured as a function of time. As a further measure of the emulsifiability of the copolymer, the stability of the creamed emulsion was assessed after a standing time of 3 weeks, a colour change of the cream of the formation of a distinguishable isododecane phase being interpreted as instability.

The initial cream rate of the emulsion was 1.7 mm per hour. This value did not change when the emulsion was carefully shaken after one day and used for a new measurement. The emulsion separated in the course of time, as a consequence of the density difference between isododecane droplets and the continuous phase, into a concentrated white upper layer (cream) and a milky-turbid aqueous phase sharply separated from the latter. After a standing time of one day, the cream volume was 59% of the total volume of liquid. This value remains constant over several weeks. It was not possible to detect any sign of coalescence of the emulsion droplets (vitrification of the cream layer or appearance of an isododecane layer on the cream) even after a standing time of 3 weeks.

EXAMPLE 7

Determination of the emulsifying properties of a perfluoroalkyl group-containing N-vinylpyrrolidone copolymer.

A copolymer comprising N-vinylpyrrolidone and N-methyl-N-perfluorooctylsulphonamidoethyl methacrylate monomer units (having a reduced specific viscosity of 38 ml/g in methanol at 30° C. and containing a proportion of perfluoroalkyl group-containing monomer units of 1 mole-% was used as the emulsifier for the preparation of a diethylaniline-in-water emulsion in accordance with the method described in Example 6. The cream rate of this emulsion was 1.1 mm per hour. After two days, the cream volume was 62% of the total volume of liquid. This value remained the same over several weeks. It was not possible to detect any coalescence of the emulsion even after a standing time of 3 weeks.

Comparison Example 2

For comparison, isododecane-in-water emulsions were prepared by the method described in Example 6 using as emulsifier the N-vinylpyrrolidone homopolymer described in Comparison Example 1. The initial cross rate of this emulsion was 5.7 mm/minute. After only a few hours after the preparation, a clear isododecane layer separated from the emulsion. After a standing time of one day, the cream layer had completely coalesced apart from a thin, glassy intermediate layer.

EXAMPLE 8

Stabilization of a silicon dioxide dispersion using a perfluoroalkyl group-containing N-vinylpyrrolidone copolymer.

100 µl of a 2% strength by weight aqueous solution of an N-vinylpyrrolidone-N-methyl-N-perfluorooctylsulfonamidoethyl methacrylate copolymer (having a reduced specific viscosity of 18 ml/g in methanol at 30° C. and containing a proportion of perfluoroalkyl group-containing monomer units of 3 mole-%) and 3.86 ml of 0.5M NaCl solution were placed in each of three 1 x 1 cm cells. 0.44 µl of an 18% strength by weight aqueous dispersion of hydrophilic silicon dioxide was then added in each case, the mixtures were homogenized, and the turbidities of the individual dispersions measured after a standing time of 2 hours. The average value was 0.75 (±0.01).

In addition, 3 dispersions of the hydrophilic silicon dioxide, stabilized with the N-vinylpyrrolidone homopolymer described in Comparison Example 1, were prepared and measured in the fashion described. The average turbidity value of this dispersion after a standing time of 2 hours was 0.58±0.01.

For comparison: measurements on stable (NaCl-free) or instable (containing 0.5 M NaCl) dispersions of hydrophilic silicon dioxide of the same concentration without addition of polymer gave turbidities of 0.78±0.01 and 0.27±0.01 respectively.

EXAMPLE 9

Stabilization of a silicon dioxide dispersion using a perfluoroalkyl group-containing N-vinylpyrrolidone copolymer.

100 μl of a 2% strength by weight aqueous solution of an N-vinylpyrrolidone-N-methyl-N-perfluorooctylsulphonamidoethyl methacrylate copolymer (having a reduced specific viscosity of 38 ml/g in methanol at 30° C. and containing a proportion of perfluoroalkyl group-containing monomer units of 1 mole-%) and 3.86 ml of 0.5M NaCl solution were placed in each of three 1×1 cm cells. 0.44 μl of an 18% strength by weight dispersion of hydrophobized silicon dioxide in methanol were then added in each case, the mixtures were homogenized, and the turbidities of the individual dispersions measured after a standing time of 2 hours. The average value was 0.62±0.01.

We claim:

1. Stabilized aqueous dispersions of inorganic oxides comprising, as a stabilizer, copolymers containing 0.01 to 35 mol-%, relative to the total monomer composition, of one or more polymerized perfluoroalkyl group-containing monomer units, 55 to 99.99 mole-% of one or more polymerized N-vinylamide monomer units, and 0 to 10 mole-% of one or more further comonomers.

2. Stabilized aqueous dispersions according to claim 1, wherein the polymerized perfluoralkyl group-containing monomer units contain saturated, perfluorinated aliphatic alkyl groups which are linear, branched or cyclic, and correspond to the formula I

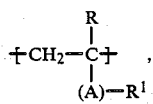
(I)

in which
R represents hydrogen or $C_1$–$C_4$-alkyl,
A represents —O—,

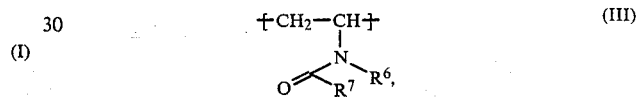

where
$R^2$ represents hydrogen or $C_1$–$C_{10}$-alkyl, and
$R^1$ represents $C_nF_{2n+1}$, where n denotes an integer from 4 to 20.

3. Stabilized aqueous dispersions according to claim 1, wherein n denotes an integer from 4 to 12.

4. Stabilized aqueous dispersions according to claim 1, containing 0.01 to 20 mole-% of one or more polymerized perfluoroalkyl group-containing monomer units.

5. Stabilized aqueous dispersions according to claim 1, wherein the polymerized N-vinylamide monomer units are cyclic or open-chain.

6. Stabilized aqueous dispersions according to claim 5 wherein the polymerized cyclic N-vinylamide monomer units correspond to the formula II

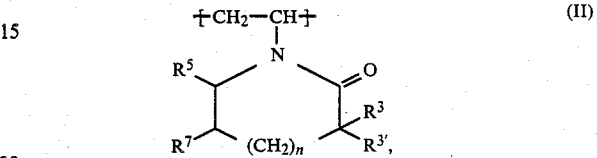

in which
n represents the integers from 0 to 2, and
$R^3$, $R^{3'}$, $R^4$ and $R^5$, independently of one another, represents a hydrogen atom (H) or $C_1$–$C_4$-alkyl groups.

7. Stabilized aqueous dispersions according to claim 5, wherein the polymerized open-chain N-vinylamide monomer units correspond to the formula III

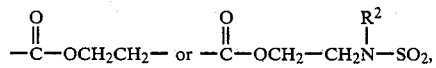

in which
$R^6$ and $R^7$, independent of one another, represent $C_1$–$C_4$-alkyl groups.

8. Stabilized aqueous dispersions according to claim 1, wherein said copolymer contain 0.01 to 10 mole-%, relative to the total monomer compositions, of one or more further comonomers.

9. Stabilized aqueous dispersions according to claim 1, wherein said copolymers are prepared by copolymerizing the mentioned amounts of comonomers in the presence of free-radical initiators.

10. Stabilized aqueous dispersions according to claim 9, wherein the copolymerization is carried out in solution.

* * * * *

UNITED STATES PATENT AND TRADEMARK OFFICE
CERTIFICATE OF CORRECTION

PATENT NO. : 4,840,989

DATED : June 20, 1989

INVENTOR(S) : Ohst et al.

It is certified that error appears in the above-identified patent and that said Letters Patent is hereby corrected as shown below:

Col. 3, line 5    Formula II delete " $R^7$ " and substitute -- $R^4$ --

Col. 10, line 19  Formula II delete " $R^7$ " and substitute -- $R^4$ --

Signed and Sealed this

Eighteenth Day of August, 1992

Attest:

DOUGLAS B. COMER

*Attesting Officer*    *Acting Commissioner of Patents and Trademarks*